March 18, 1952 J. O. WAGNER 2,589,462
DOLL'S EYE
Filed Aug. 6, 1949 3 Sheets-Sheet 1

JOHN O. WAGNER
*INVENTOR.*

BY
ATTORNEY

March 18, 1952     J. O. WAGNER     2,589,462
DOLL'S EYE
Filed Aug. 6, 1949     3 Sheets-Sheet 2
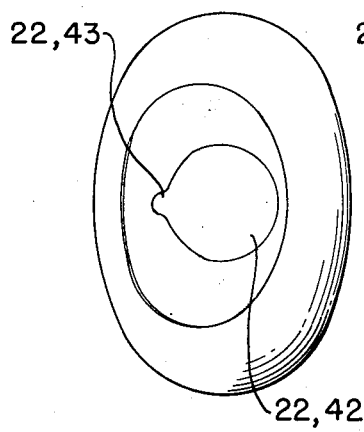
FIG.5
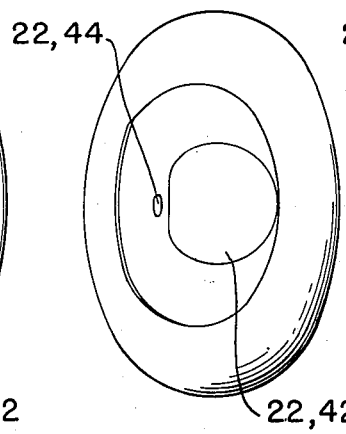
FIG.6
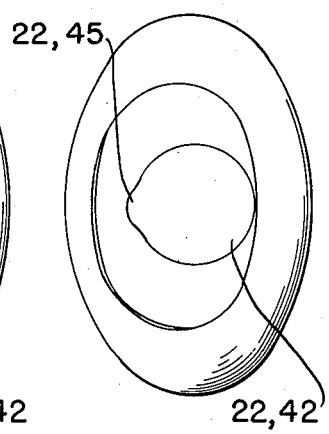
FIG.7
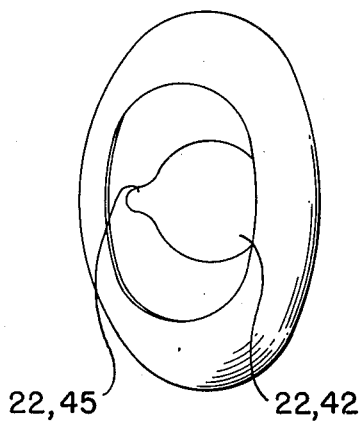
FIG.8
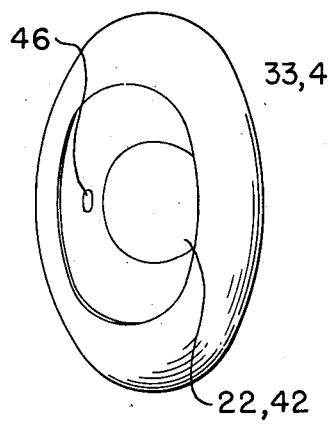
FIG.9
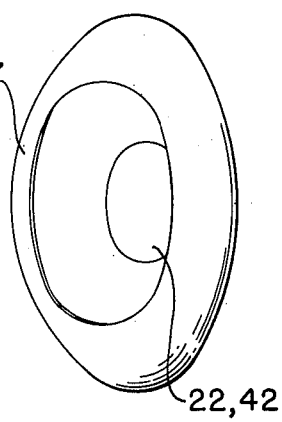
FIG.10
JOHN O. WAGNER
*INVENTOR.*
BY 
ATTORNEY

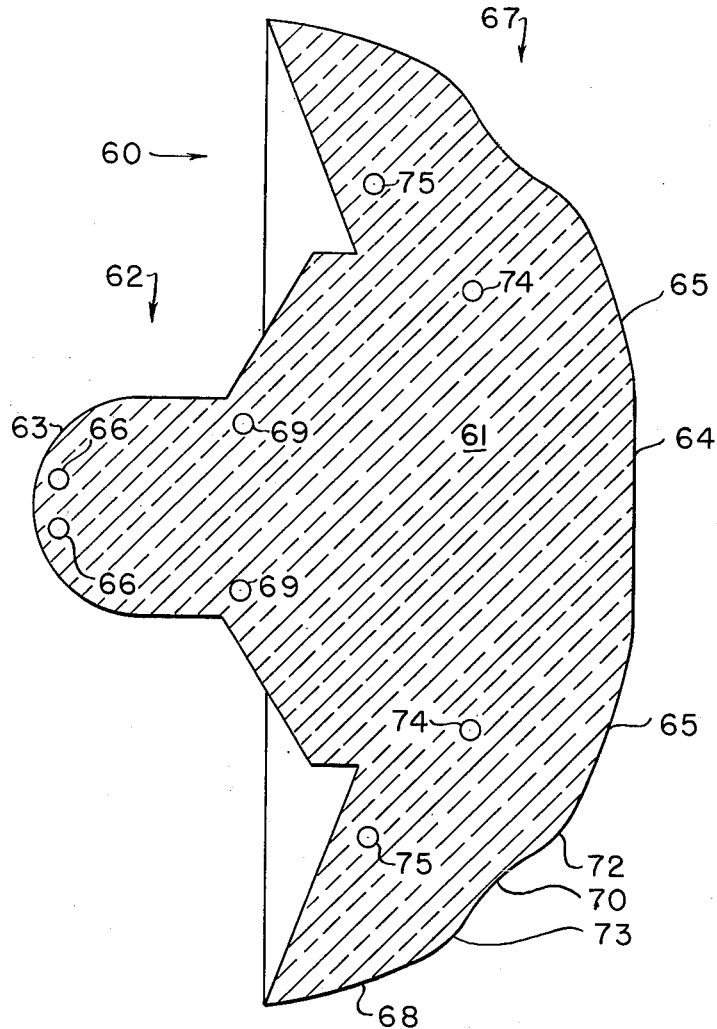

Patented Mar. 18, 1952

2,589,462

UNITED STATES PATENT OFFICE 2,589,462

DOLL'S EYE

John O. Wagner, Palisade, N. J.

Application August 6, 1949, Serial No. 109,000

6 Claims. (Cl. 46—165)

1

The present invention relates to eyes for dolls and refers more particularly to improvements in the type of eye disclosed in my copending application, Serial No. 740,295, filed April 9, 1947, in which the eye is of integral and transparent construction and comprises a parti spherical front surface representing the entire eye ball, and in which the pupil, iris and white are defined by formations of the rear surface of the eye and seen through the transparent body thereof.

An object of the present invention is to give the eye a live appearance by a construction which causes an intensification of the appearance of motion of the pupil when the doll is turned sidewise so that the eye is viewed from different successive angles of view.

Other objects will become apparent as the description proceeds.

In accomplishing the objects of the present invention a front central portion of the curved front surface of the eye is formed flat or with a greater radius of curvature than the surrounding front portion. When the doll is turned in any direction, the pupil, as seen through the surrounding curved portion of the front surface dilates rapidly while the portion of the pupil seen through the flat portion fails to dilate, accentuating the dilation of the portion seen through the curved portion of the front surface. As the eye is turned to a point at which the pupil is viewed almost entirely through the curved portion and that part of the pupil viewed through the flat portion seems to be due to disappear, the entire pupil appears pear shaped, the neck of the pear being the undilated portion seen through the flat front surface. This portion instead of simply disappearing, first disconnects itself from the larger portion, then disappears, then another pear neck appears to grow forward from the larger portion, disconnects itself and finally disappears, all the above taking place as the eye is viewed from progressively greater angles of inclination.

In the preferred form of the invention, the curved portion surrounding the flat is also reentrantly curved. In this form the above described nipping off of the pear neck takes place three times, while the body of the pear is more noticeably magnified.

Other objects of this invention will in part be obvious and in part hereinafter be pointed out. The invention accordingly consists in the features of construction, combinations of elements and arrangements of parts which will be

2 exemplified in the constructions hereinafter described. In the accompanying drawing, in which are shown three of the various possible illustrative embodiments of this invention:

Figures 4 through 10 are elevational views of the eye at progressively greater angles of inclination to a straight ahead view thereof.

Figure 12 is an axial section of the preferred form of the invention.

Figure 1:
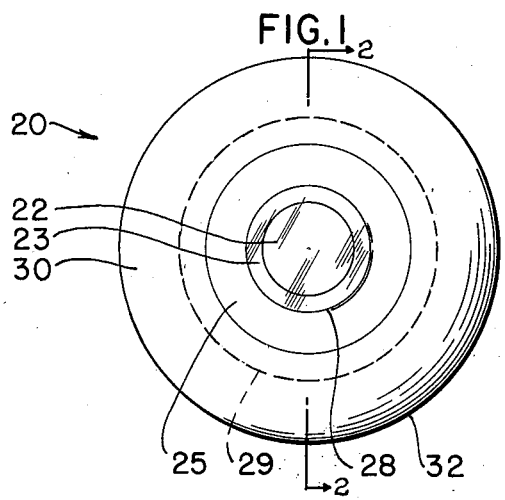
Figure 1 is a front elevation of a doll's eye embodying the present invention.

Referring now in detail to the drawings, the improved doll's eye 20 comprises a body portion 21 and a substantially cylindrical rear portion 22 integral therewith and extending rearwardly therefrom.

Body portion 21 has a front surface which will be called a hemispheroid, differing from a hemisphere in two important respects. The front central portion has a substantially flat, round surface 23 which is one quarter inch in diameter, and is perpendicular to the axis of rear portion 22, which axis will be referred to as the axis of the eye. The curved front surface 24 of body portion 21 is symmetrical, and the axial section of the eye comprises, on either side of the flat front surface 23, a convex portion 25 drawn about a point at the center of circle 26 on the axis of the eye and on a comparatively long radius of curvature, namely .468 inch. The imaginary lines 27 drawn between the outer boundaries of portion 25 and the center of circle 26 subtend an angle of seventy degrees and are approximately tangent to the forward corners of rear portion 22. In axial section the surface 23 appears as a chord cutting the surface 25, and the boundary line 28 between them will be called the minor circumference of the front surface 24.

Figure 2:
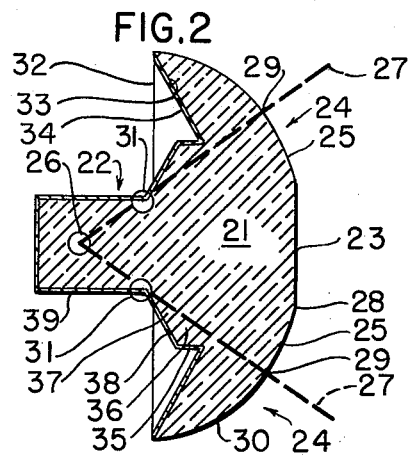
Figure 2 is a section on the line 2—2 of Figure 1.

Surrounding the portion 25 and smoothly merging therewith so that the boundary 29 between them is invisible as such for all practical purposes, is the convex portion 30, each axial section of which, as in Figure 2, is drawn on the comparatively short radius of curvature of .312 inch around points at the centers of circles 31. The outer boundary 32 of portion 30 is circular and also constitutes the major circumference of front surface 24 and of eye 20. Boundary 32 is substantially perpendicular to the axis of the eye.

It is thus seen that surface 23 is circular and surfaces 25 and 30 are annular and concentric therewith. Surfaces 25 and 30, because they merge smoothly, further constitute a single, convex surface surrounding the flat surface 23, and such last mentioned configuration, in combination with the representations of pupil, iris and white of the eye located in spaced relation to the rear of front surface 24, constitute the broad outline of the present invention.

Rear surface 33 is frusto conical, extending forwardly from boundary 32 at an angle of 25 degrees therewith. It is painted or otherwise covered by a layer of white material 34 so as to simulate the white of the eye. The white material further extends in a layer 35 so as to cover the shallow cylindrical portion 36 which is thus included in the portion representing the white of the eye.

A frusto conical portion 37 extends rearwardly from cylindrical portion 36, and is covered with a layer of colored pigment 38 so as to constitute a simulation of the iris of the eye. The surface of portion 37 extends at an angle of 35 degrees to the boundary 32.

The cylindrical rear portion 22 is covered with black pigment 39 whereby it is constituted a simulation of the pupil of the eye.

The method of operation of the invention consists in the very apparent movement within the eye as it is viewed from progressively greater or lesser angles of inclination of the axis of the eye as the eye is revolved so as to incline the axis to a person viewing the same. Such operation is illustrated in Figures 4 through 10.

Figure 3:
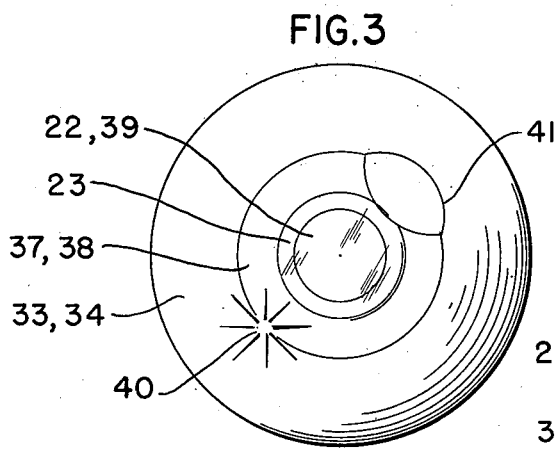
Figure 3 is a view identical with Figure 1 and illustrating one effect produced by a light source thereon.

A minor effect of the invention is illustrated in Figure 3. A point of brilliance 40, created by a point source of light such as the sun or an incandescent electric bulb, creates an elliptical ring of brilliance 41 which is very pleasing. The point 40 and the ring 41 of course migrate as the eye is turned in various directions, the ring 41 being the image of the boundary 28 between the flat surface 23 and the curved surface 25.

Figure 4:
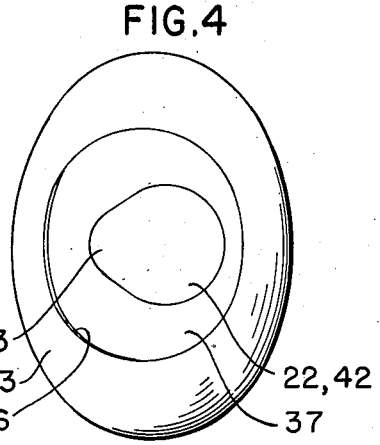

Figure 4 illustrates the first stage of the characteristic appearance of the eye as it is turned sidewise. A similar effect of course appears if the eye is tilted up or down. The right side of pupil 22 has moved to the right noticeably, as well as growing in vertical diameter, producing a body 42 of a pear shape, while the left side has not only failed to magnify but appears noticeably constricted so as to constitute the neck 43 of a pear shape. The layer 35 of white pigment on the side of cylindrical portion 36 also appears at this time.

In Figure 5 the pear neck 43 is further constricted as the eye is further inclined to the side. In Figure 6 the neck 43 has disappeared and a small spot 44 remains approximately in its place but displaced from the body portion 42. In Figure 7 spot 44 has disappeared, and a second pear neck 45 has begun to grow forward from body 42. In Figure 8 the pear neck 45 has begun to constrict. In Figure 9 the neck as such is no longer present, only the smal separate spot 46 remaining. In Figure 10 the spot 46 has disappeared. Such appearance of motion within the eye gives a very realistic impression that the eye is alive, even though it may not simulate with perfect fidelity the appearance of a human eye under ordinary conditions. Since a child in handling the doll moves the same from side to side, and up and down, sometimes rapidly, sometimes slowly, the particular effect produced by successive motions of the doll will seem to be infinitely varied, as in a living organism.

Another very desirable feature of the illustrated construction may be seen best in Figure 10, in which the eye 20 is seen at a very considerable inclination. It should be noted that a considerable portion 47 of the simulated white of the eye 33 is still visible at the left of the eye which is the far side from the observer. Figure 10 could thus also serve as an illustration of the eye viewed from above horizontal and with its axis inclined below horizontal. The eye of a live person whose head is directed slightly downward but whose eyes are directed upward will show such a portion of white below the iris, and it is not believed that artificial eyes other than my own have ever before displayed this particular feature of naturalness.

Figure 11:
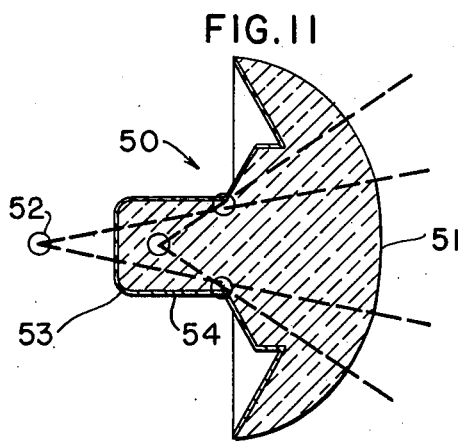
Figure 11 is a view similar to Figure 2, of a modified form of the invention.

Figure 11 illustrates a modified form of the invention in which the eye 50 has a front central portion 51 of its front surface curved on a comparatively very long radius of curvature around the point at the center of the circle 52 located to the rear of the rear boundary of eye 50. With one other exception to be mentioned immediately, eye 50 is identical to eye 20 and its particular dimensions will receive no further comment. The rear corners 53 of the eye are rounded instead of square as eye 20 in Figure 2, as such construction avoids the tendency of the paint 54 to chip on square corners. The characteristics of eye 50 are similar to those of eye 20 and approach more and more nearly to identity therewith as the radius of curvature of portion 51 is lengthened.

The eye 60, Figure 12, illustrates the preferred form of my invention and except as noted is identical with eye 20. Eye 60 has a body portion 61 and rear cylindrical portion 62, the rear surface 63 of which is hemispherical and thus presents the best possible surface for the particular location to receive a coat of paint without chipping. The flat, circular front surface 64 is surrounded by the annular convex surface 65 which is drawn about the points at the centers of circles 66 very slightly dispaced from the axis of the eye, and on the radius of .468 inch identical to eye 20. The front surface 67 of body 61 further comprises as its outermost portion the annular convex surface 68 drawn around points at the centers of circles 69 on a radius of curvature of .312 inch identical to eye 20. Between the annular convex surfaces 65, 68 is the reentrantly curved or concave surface 70 drawn about points at the centers of circles 71 on a radius of curvature of .312 inch. The surface 70 merges smoothly with surfaces 65, 68 via the convex surfaces 72, 73 drawn about points at the centers of circles 74, 75 respectively on a radius of curvature of .100 inch.

The characteristics of eye 60 may be accurately described as those of eye 20 further developed and intensified. In particular, the body 42 of the pear of eye 20 is even further magnified in eye 60, and not two but three pear necks appear to grow out of the body and disappear.

It is worth noting that although the axis of the eye has been defined up to now only by stating that it is the axis of rear portion 22 or 62, the eye of the invention does not need a rear portion of cylindrical shape in order to function. The function of the rear portion is to simulate the pupil of the eye, and this may be done by any construction which when viewed from directly in front will present a well defined circular appearance of dark color. Thus, is the frusto conical portion 37 were the rearmost portion of the eye and if its rear surface were painted black, the same appearance would result when viewed from the front as in the illustrated construction. Such an eye would still properly be described as having an axis, as the various surfaces, front and back, of the eye are symmetrical and comprise a circular factor. Thus any mathematician could plot the axis of the eye about which said surfaces were generated even if the eye did not possess the illustrated rear portions 22 or 62. Portions 22, 62 are chiefly useful in handling the eye while applying lashes to it, installing it in the head, and so forth.

It is of course understood that before installing the eye in the head, it is frequently cut down to conform to the laterally elongated appearance of that part of the human eye which is visible when the eye is normally open. Such practice being well known, it has not been illustrated.

It will thus be seen that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. In a doll's eye, of the type comprising a body portion of transparent material, said body portion comprising on its rear surface portions representing the pupil, iris, and white of the eye, said body portion comprising a hemispheroid front surface, the improvement comprising a substantially flat portion located substantially front centrally of said front surface.

2. In a doll's eye of the type comprising a body portion constructed of transparent material, said body portion comprising on its rear surface portions representing the pupil, iris and white of the eye, said body portion further comprising a curved front surface, the improvement comprising a substantially flat portion of said front surface located substantially directly in front of said pupil portion.

3. In a doll's eye of the type comprising a body portion constructed of transparent material, said body portion comprising on its rear surface portions representing the pupil, iris and white of the eye, said body portion further comprising a curved front surface, the improvement comprising a substantially flat portion continuous with and located within said curved front surface.

4. In a doll's eye of the type comprising a body portion constructed of transparent material, said body portion comprising on its rear surface portions representing the pupil, iris and white of the eye, said body portion further comprising a curved front surface, the improvement comprising a portion located in and constituting part of said curved front surface, said last mentioned portion being curved on a substantially longer radius of curvature than said surrounding curved front surface.

5. In a doll's eye comprising a transparent body portion, said body portion comprising on its rear surface portions representing the pupil, iris and white of the eye, said body portion further comprising a hemispheroid front surface, the improvement comprising a substantially flat portion located substantially centrally of said front surface, said front surface further comprising a portion curved on a comparatively long radius of curvature and surrounding said flat portion, said front surface further comprising a portion curved on a comparatively short radius of curvature and at least partially surrounding said last mentioned portion.

6. In a doll's eye according to claim 5, said radii of curvature bearing the relation of approximately 3 to 2 respectively.

JOHN O. WAGNER.

REFERENCES CITED

The following references are of record in the file of this patent:

UNITED STATES PATENTS

| Number | Name | Date |
|---|---|---|
| 1,373,579 | Wendtland | Apr. 5, 1921 |
| 1,569,563 | Muller | Jan. 12, 1926 |
| 2,051,876 | Marcus | Aug. 25, 1936 |
| 2,394,400 | Noles | Feb. 5, 1946 |
| 2,425,510 | Cohn | Aug. 12, 1947 |

FOREIGN PATENTS

| Number | Country | Date |
|---|---|---|
| 745,155 | France | Feb. 7, 1933 |